(12) United States Patent
Ishida et al.

(10) Patent No.: US 8,846,264 B2
(45) Date of Patent: Sep. 30, 2014

(54) FUEL CELL COMPRISING OFFSET CONNECTION CHANNELS

(75) Inventors: Kentaro Ishida, Utsunomiya (JP);
Shuhei Goto, Utsunomiya (JP);
Narutoshi Sugita, Utsunomiya (JP);
Tetsuya Nakamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 230 days.

(21) Appl. No.: 13/472,717

(22) Filed: May 16, 2012

(65) Prior Publication Data

US 2012/0295177 A1 Nov. 22, 2012

(30) Foreign Application Priority Data

May 20, 2011 (JP) ................................ 2011-113321

(51) Int. Cl.
| | | |
|---|---|---|
| H01M 8/02 | (2006.01) | |
| H01M 8/04 | (2006.01) | |
| H01M 8/22 | (2006.01) | |
| H01M 8/24 | (2006.01) | |

(52) U.S. Cl.
CPC .......... *H01M 8/0273* (2013.01); *H01M 8/0276* (2013.01); *Y02E 60/50* (2013.01); *H01M 8/0267* (2013.01); *H01M 8/242* (2013.01); *H01M 8/04089* (2013.01); *H01M 8/04029* (2013.01)
USPC ........... 429/458; 429/434; 429/464; 429/469; 429/502

(58) Field of Classification Search
USPC ......... 429/434, 457, 510, 483, 456, 479, 502, 429/469, 464, 458
See application file for complete search history.

(56) References Cited

U.S. PATENT DOCUMENTS

| | | | |
|---|---|---|---|
| 6,322,919 B1* | 11/2001 | Yang et al. .................... 429/457 |
| 2002/0192522 A1* | 12/2002 | Wada et al. ..................... 429/26 |
| 2003/0003343 A1* | 1/2003 | Cisar et al. ....................... 429/36 |
| 2004/0170883 A1* | 9/2004 | Bartholomeyzik et al. ...... 429/36 |
| 2006/0051654 A1* | 3/2006 | Beutel et al. .................... 429/38 |
| 2007/0269697 A1* | 11/2007 | Randon et al. .................. 429/26 |
| 2007/0281194 A1* | 12/2007 | Cortright et al. ................ 429/26 |
| 2009/0004539 A1 | 1/2009 | Ishikawa et al. |
| 2012/0258377 A1 | 10/2012 | Sugita et al. |

FOREIGN PATENT DOCUMENTS

| | | |
|---|---|---|
| DE | 10 2012 205 644 A1 | 10/2012 |
| JP | 2009-009838 A | 1/2009 |

* cited by examiner

*Primary Examiner* — Kenneth Douyette
(74) *Attorney, Agent, or Firm* — Carrier Blackman & Associates, P.C.; Joseph P. Carrier; Michael J. McCandlish

(57) ABSTRACT

A cell unit of a fuel cell includes a first membrane electrode assembly, a first metal separator, a second membrane electrode assembly, and a second metal separator. Resin frame members are provided at the outer ends of the first and second membrane electrode assemblies. Coolant connection channels including a plurality of grooves is formed in each of the resin frame members. The grooves of the coolant connection channels of the cell unit and grooves of coolant connection channels of a cell unit that is adjacent to the cell unit in the stacking direction are offset from each other, and are not overlapped with each other in the stacking direction.

4 Claims, 16 Drawing Sheets

US 8,846,264 B2

FUEL CELL COMPRISING OFFSET CONNECTION CHANNELS

CROSS-REFERENCE TO RELATED APPLICATION

This application is based upon and claims the benefit of priority from Japanese Patent Application No. 2011-113321 filed on May 20, 2011, of which the contents are incorporated herein by reference.

BACKGROUND OF THE INVENTION

1. Field of the Invention

The present invention relates to a fuel cell including cell units each formed by stacking an electrolyte electrode assembly and a metal separator. The electrolyte electrode assembly includes a pair of electrodes and an electrolyte interposed between the electrodes. A plurality of fluid flow fields are formed in each of the cell units for allowing fluids of a fuel gas, an oxygen-containing gas, and a coolant to flow along electrode surfaces.

2. Description of the Related Art

For example, a solid polymer electrolyte fuel cell employs a membrane electrode assembly (electrolyte electrode assembly) (MEA) which includes an anode, a cathode, and a solid polymer electrolyte membrane interposed between the anode and the cathode. The solid polymer electrolyte membrane is a polymer ion exchange membrane. Each of the anode and the cathode includes an electrode catalyst layer and a porous carbon layer. The membrane electrode assembly and separators (bipolar plates) sandwiching the membrane electrode assembly make up a unit cell. In use, generally, a predetermined number of unit cells are stacked together to form a fuel cell stack mounted in a vehicle.

In general, mostly, the fuel cell adopts so called internal manifold structure where a fuel gas supply passage and a fuel gas discharge passage as passages of a fuel gas, an oxygen-containing gas supply passage and an oxygen-containing gas discharge passage as passages of an oxygen-containing gas, and a coolant supply passage and a coolant discharge passage as passages of a coolant extend through the cell units in the stacking direction.

Therefore, in the separators, a plurality of fluid passages, i.e., the fuel gas supply passage, the fuel gas discharge passage, the oxygen-containing gas supply passage, the oxygen-containing gas discharge passage, the coolant supply passage, and the coolant discharge passage are provided. Thus, the area of the separators is considerably large. In particular, in the case where metal separators are adopted as the separators, the amount of expensive material such as stainless steel used for the separators is increased, and the unit cost of the part becomes high.

In this regard, for example, in a fuel cell disclosed in Japanese Laid-Open Patent Publication No. 2009-009838, electrolyte electrode assemblies and metal separators are stacked, each of the electrolyte electrode assemblies includes a pair of electrodes and an electrolyte interposed between the electrodes, and a resin frame is provided at the outer end of the electrolyte electrode assembly. Fluid passages extend through the frame, and the metal separator is positioned inside the fluid passages.

SUMMARY OF THE INVENTION

In general, in the internal manifold type fuel cell, for example, a coolant flow field for allowing a coolant flow in a direction along electrode surfaces, coolant passages for allowing the coolant to flow in the stacking direction, and coolant connection grooves (fluid connection channels) connecting the coolant flow field to the coolant passages are provided. For example, as shown in FIG. 16, a fuel cell 1 is formed by stacking membrane electrode assemblies 2 and metal separators 3 in a direction indicated by an arrow X, and each of the membrane electrode assemblies has a frame (resin frame member) 4. A plurality of grooves 5 connecting a coolant flow field (not shown) and a coolant passage are formed in the frame 4.

In the state where the frames 4 are stacked together in the direction indicated by the arrow X, the grooves 5 of the respective frames 4 are overlapped with each other in the stacking direction indicated by the arrow X. Thus, thin portions 6 of the frames 4 are overlapped with each other, and stress concentration tends to occur in the thin portions 6. As a result, the thin portions 6 can be damaged easily. In this regard, in order to ensure that the thin portions 6 have the desired strength, the thickness of the thin portions 6 needs to be increased considerably. As a result, the dimension of the fuel cell 1 in the stacking direction becomes large as a whole.

The present invention has been made to solve the problems of this type, and an object of the present invention is to provide a fuel cell which makes it possible to suitably reduce the size of resin frame members, and reliably maintain the desired strength.

The present invention relates to a fuel cell formed by stacking a plurality of cell units. Each of the cell units is formed by stacking an electrolyte electrode assembly and a metal separator. The electrolyte electrode assembly includes a pair of electrodes and an electrolyte interposed between the electrodes. A plurality of fluid flow fields are formed in each of the cell units for allowing fluids of a fuel gas, an oxygen-containing gas, and a coolant, respectively, to flow in a direction along electrode surfaces.

In the fuel cell, a resin frame member is provided integrally with an outer end of the electrolyte electrode assembly. A plurality of fluid passages extend through the resin frame member in the stacking direction. A plurality of connection channels connecting one of the fluid passages and one of the fluid flow fields are formed in the resin frame member for allowing the same fluid to flow through the fluid passage and the fluid flow field. In the cell units that are adjacent to each other in the stacking direction, one of the connection channels and the other of the connection channels are offset from each other, and are not overlapped with each other in the stacking direction.

In the present invention, a plurality of connection channels are formed in the resin frame member provided at the outer end of the electrolyte electrode assembly. In the cell units that are adjacent to each other in the stacking direction, the connection channels of the resin frame members of the adjacent unit cells are offset from each other, and are not overlapped with each other in the stacking direction.

In the structure, in the adjacent cell units, since the thin portions of the resin frame members are not overlapped with each other in the stacking direction, it becomes possible to reliably suppress stress concentration in the thin portions. Thus, the thickness of the resin frame member can be reduced suitably, it becomes possible to reliably maintain the desired strength, and achieve size reduction in the entire fuel cell easily.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
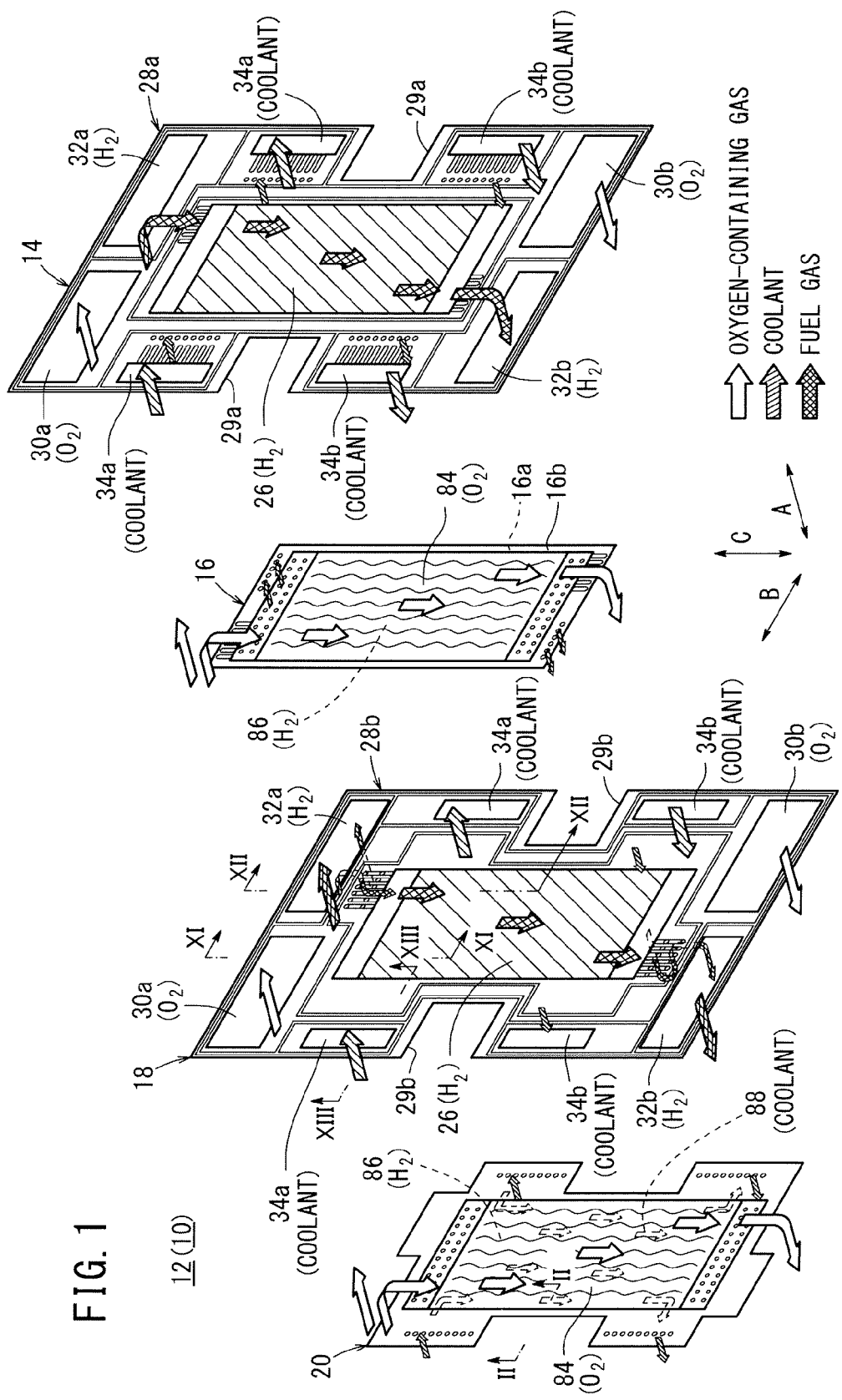
FIG. 1 is an exploded perspective view showing a fuel cell according to a first embodiment of the present invention.
Figure 2:
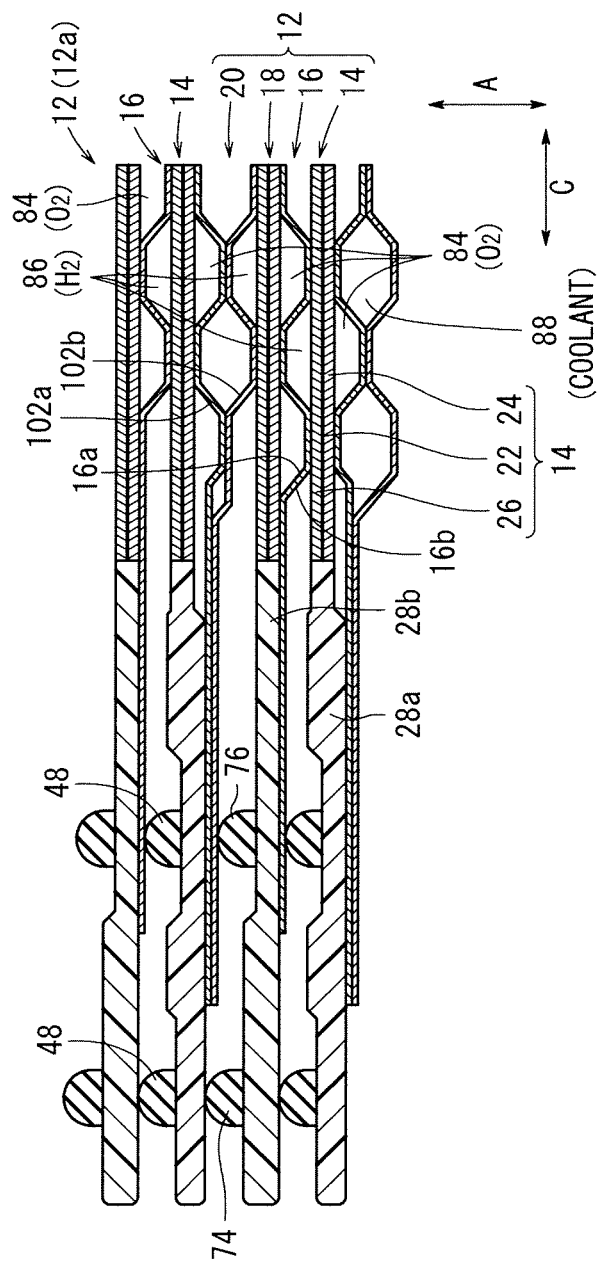
FIG. 2 is a cross sectional view showing the fuel cell, taken along a line II-II in FIG. 1.

As shown in FIGS. 1 and 2, a fuel cell 10 according to a first embodiment of the present invention is formed by stacking a plurality of cell units 12 (including a cell unit 12a to be described later) in a horizontal direction indicated by an arrow A.

The cell unit 12 includes a first membrane electrode assembly (electrolyte electrode assembly) (MEA) 14, a first metal separator 16, a second membrane electrode assembly (electrolyte electrode assembly) (MEA) 18, and a second metal separator 20. By stacking the cell units 12, the first membrane electrode assembly 14 is sandwiched between the second metal separator 20 and the first metal separator 16, and the second membrane electrode assembly 18 is sandwiched between the first metal separator 16 and second metal separator 20.

Each of the first membrane electrode assembly 14 and the second membrane electrode assembly 18 includes a cathode 24, an anode 26, and a solid polymer electrolyte membrane (electrolyte) 22 interposed between the cathode 24 and the anode 26 (see FIG. 2). The solid polymer electrolyte membrane 22 is formed by impregnating a thin membrane of perfluorosulfonic acid with water, for example.

In the solid polymer electrolyte membrane 22, the surface area of the cathode 24 and the surface area of the anode 26 are the same. It should be noted that the outer circumferential portion of the solid polymer electrolyte membrane 22 may protrude beyond the cathode 24 and the anode 26. The surface area of the cathode 24 may be different from the surface area of the anode 26.

In the first membrane electrode assembly 14, a resin frame member (frame) 28a made of insulating polymer material is formed integrally with the outer circumferential edges of the solid polymer electrolyte membrane 22, the cathode 24 and the anode 26, e.g., by injection molding. Likewise, in the second membrane electrode assembly 18, a resin frame member (frame) 28b made of an insulating polymer material is formed integrally with the outer circumferential edges of the solid polymer electrolyte membrane 22, the cathode 24 and the anode 26, e.g., by injection molding. For example, engineering plastics and super engineering plastics as well as commodity plastics may be adopted as the polymer material.

As shown in FIG. 1, each of the resin frame members 28a, 28b has a substantially rectangular shape elongated in a direction indicated by an arrow C. A pair of recesses 29a, 29b are formed centrally in each of the resin frame members 28a, 28b by cutting the central portion of each long side inwardly.

Each of the cathode 24 and the anode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer.

As shown in FIG. 1, at one end (upper end) of the resin frame members 28a, 28b in a vertical direction indicated by an arrow C, an oxygen-containing gas supply passage (fluid passage) 30a for supplying an oxygen-containing gas (fluid) and a fuel gas supply passage (fluid passage) 32a for supplying a fuel gas (fluid) such as a hydrogen-containing gas are arranged in a horizontal direction in a direction indicated by an arrow B.

At the other end (lower end) of the resin frame members 28a, 28b in the vertical direction indicated by the arrow C, a fuel gas discharge passage (fluid passage) 32b for discharging the fuel gas and an oxygen-containing gas discharge passage (fluid passage) 30b for discharging the oxygen-containing gas are arranged in the direction indicated by the arrow B.

At upper positions at both ends of the resin frame members 28a, 28b in the direction indicated by the arrow B, a pair of coolant supply passages (fluid passage) 34a for supplying a coolant (fluid) are provided, and at lower positions at both ends of the resin frame members 28a, 28b in the direction indicated by the arrow B, a pair of coolant discharge passages (fluid passage) 34b for discharging the coolant are provided. The coolant supply passages 34a and the coolant discharge passages 34b extend through the resin frame members 28a, 28b in the direction indicated by the arrow A.

The coolant supply passages 34a are positioned adjacent to the oxygen-containing gas supply passage 30a and the fuel gas supply passage 32a, separately on the sides (other pair of sides) at both ends in the direction indicated by the arrow B. The coolant discharge passages 34b are positioned adjacent to the oxygen-containing gas discharge passage 30b and the fuel gas discharge passage 32b, separately on the sides at both ends in the direction indicated by the arrow B. The coolant supply passages 34a and the coolant discharge passages 34b may be provided upside down. That is, the coolant supply passages 34a may be positioned adjacent to the oxygen-containing gas discharge passage 30b and the fuel gas discharge passage 32b.

Figure 3:
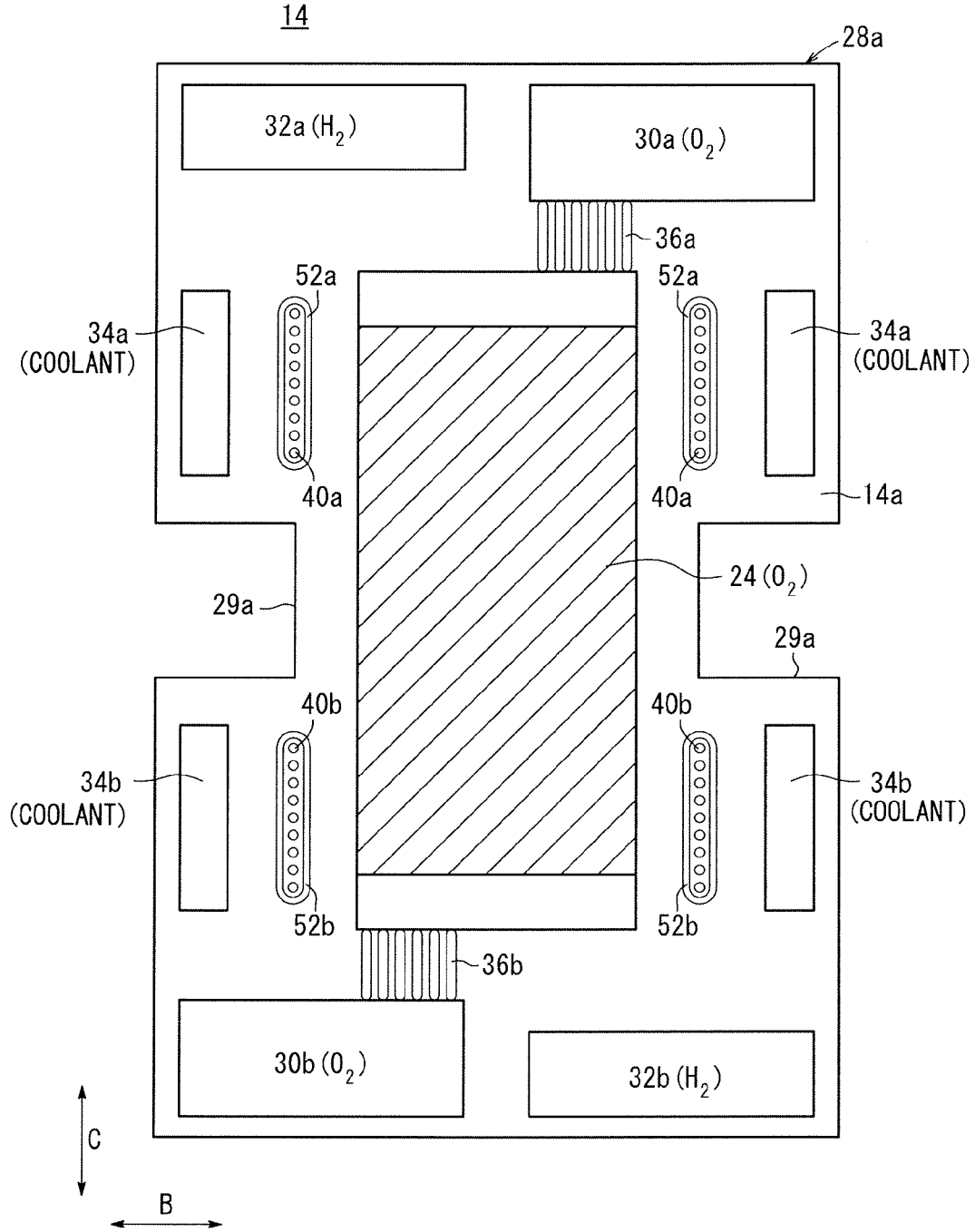
FIG. 3 is a view showing a cathode surface of a first membrane electrode assembly of the fuel cell.

As shown in FIG. 3, the resin frame member 28a has a plurality of inlet grooves 36a at upper positions of the cathode surface (the surface where the cathode 24 is provided) 14a of the first membrane electrode assembly 14 and adjacent to the lower side of the oxygen-containing gas supply passage 30a. At upper positions at both ends of the cathode surface 14a in the width direction indicated by the arrow B, a plurality of inlet holes 40a extend through the resin frame member 28a. The inlet holes 40a are arranged along the width direction of each of the coolant supply passages 34a in the direction indicated by the arrow C.

The resin frame member 28a has a plurality of outlet grooves 36b at a lower position of the cathode surface 14a, adjacent to the upper side of the oxygen-containing gas discharge passage 30b. Further, at lower positions at both ends of the cathode surface 14a in the width direction, a plurality of outlet holes 40b extend through the resin frame member 28a. The inlet holes 40a are arranged along the width direction of each of the coolant discharge passages 34b in the direction indicated by the arrow C.

Figure 4:
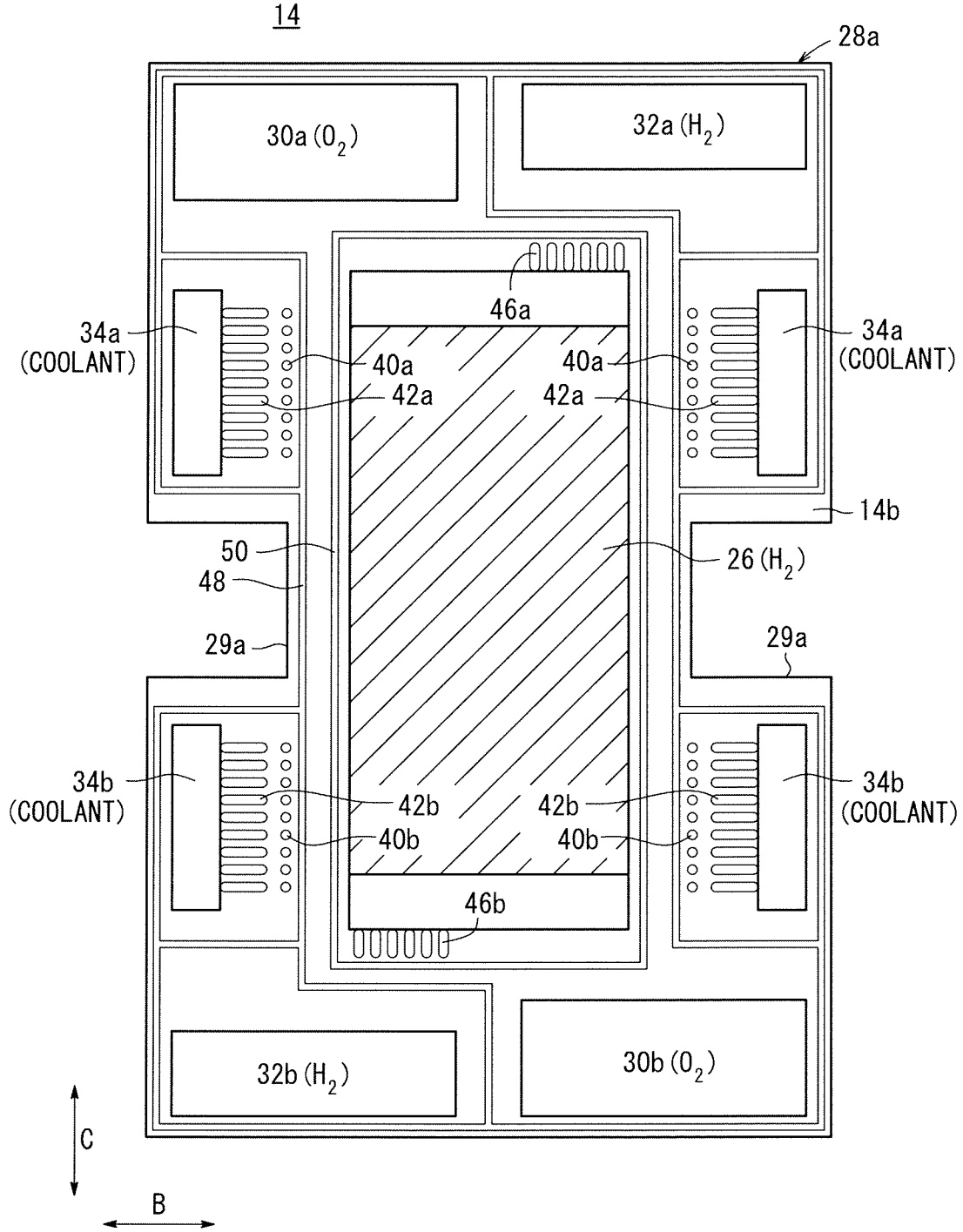
FIG. 4 is a view showing an anode surface of the first membrane electrode assembly.

As shown in FIG. 4, the resin frame member 28a has a plurality of inlet grooves 42a at upper positions on both ends of the anode surface (the surface where the anode 26 is provided) 14b of the first membrane electrode assembly 14 in the width direction and along the width direction of each of the coolant supply passages 34a. The resin frame member 28a has a plurality of outlet grooves 42b at lower positions on both ends of the anode surface 14b in the width direction and along the width direction of each of the coolant discharge passages 34b.

The resin frame member 28a has a plurality of inlet grooves 46a below the fuel gas supply passage 32a, and a plurality of outlet grooves 46b above the fuel gas discharge passage 32b.

An outer seal member (outer seal line) 48 and an inner seal member (inner seal line) 50 are provided integrally with the anode surface 14b of the resin frame member 28a. Alternatively, the outer seal member 48 and the inner seal member 50 may be formed separately from the resin frame member 28a, and provided on the anode surface 14b of the resin frame member 28a. Each of the outer seal member 48 and the inner seal member 50 is made of seal material, cushion material or packing material such as an EPDM rubber (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber. Seal members as described later have the same structure as those of the outer seal member 48 and the inner seal member 50, and description thereof will be omitted.

The outer seal member 48 is provided along the outer circumferential end of the resin frame member 28a and around all of the fluid passages, i.e., the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b and around the reaction surface (power generation surface). The outer seal member 48 surrounds respectively the coolant supply passages 34a, the fuel gas supply passage 32a, the coolant discharge passages 34b and the fuel gas discharge passage 32b. The outer seal member 48 surrounds the inlet grooves 42a, the inlet holes 40a and the coolant supply passages 34a together, and surrounds the outlet grooves 42b, the outlet holes 40b and the coolant discharge passages 34b together.

The inner seal member 50 is positioned inside the outer seal member 48, and surrounds the anode 26, the inlet grooves 46a and the outlet grooves 46b together. The inner seal member 50 is provided along a profile line corresponding to the outer shape of the first metal separator 16, and contacts the entire outer circumferential surface of the first metal separator 16 (within the separator surface). The outer seal member 48 is provided around the outer end of the first metal separator 16 (outside the separator surface). All of the fluid passages are hermetically surrounded by the outer seal member 48 and the inner seal member 50.

As shown in FIG. 3, on the cathode surface 14a of the resin frame member 28a, a ring-shaped inlet seal member 52a surrounding the inlet holes 40a and a ring-shaped outlet seal member 52b surrounding the outlet holes 40b are provided.

Figure 5:
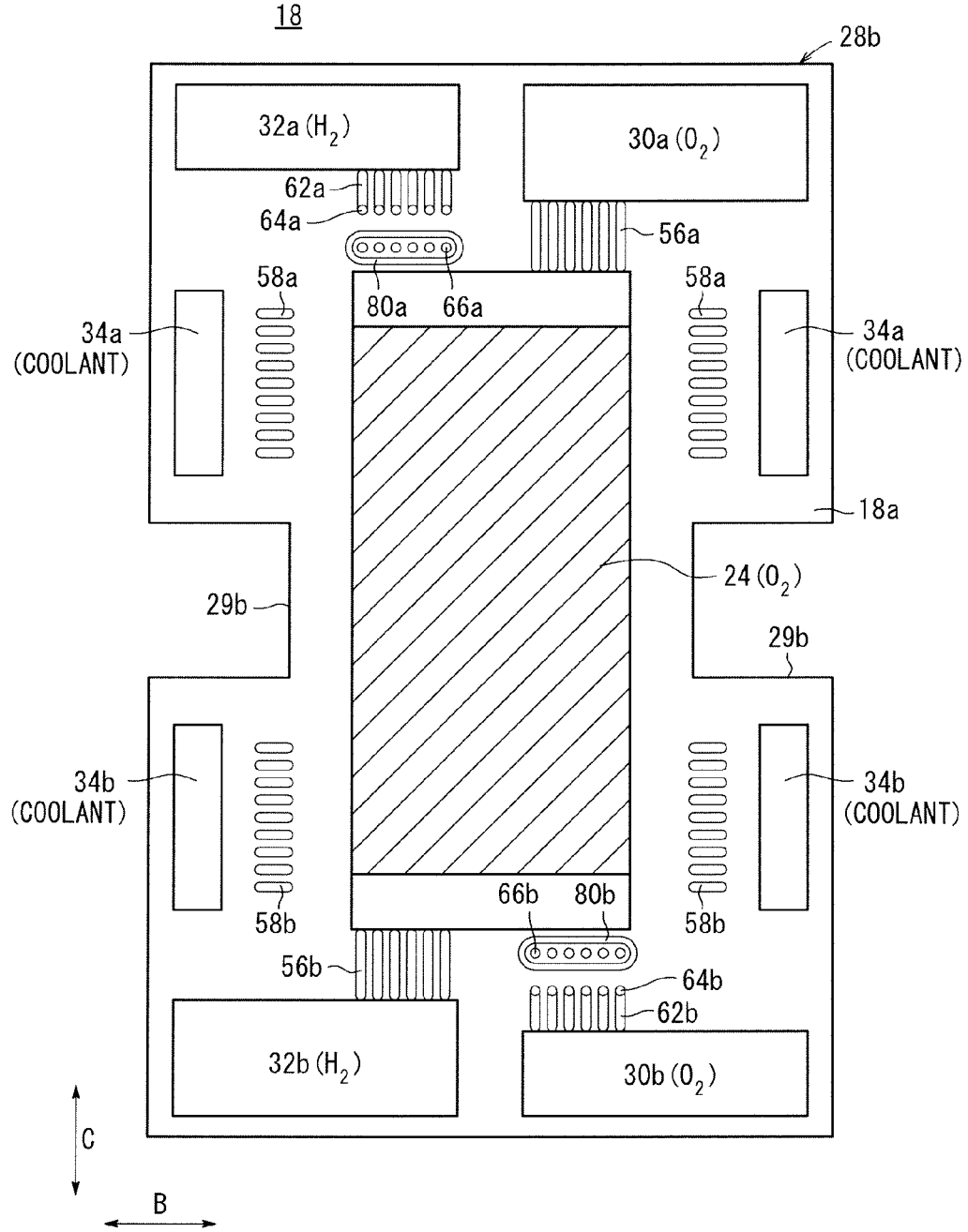
FIG. 5 is a view showing a cathode surface of a second membrane electrode assembly of the fuel cell.

As shown in FIG. 5, the resin frame member 28b has a plurality of inlet grooves 56a at upper positions of the cathode surface (the surface where the cathode 24 is provided) 18a of the second membrane electrode assembly 18 and adjacent to the lower side of the oxygen-containing gas supply passage 30a.

The resin frame member 28b has a plurality of inlet grooves 58a at upper positions on both ends of the cathode surface 18a in the width direction and along the width direction of each of the coolant supply passages 34a. The resin frame member 28b has a plurality of inlet grooves 62a at upper positions of the cathode surface 18a and adjacent to the lower side of the fuel gas supply passage 32a. A plurality of inlet holes 64a extend through the resin frame member 28b at the lower ends of the inlet grooves 62a. A plurality of inlet holes 66a extend through the resin frame member 28b below the inlet holes 64a and at positions spaced at predetermined distances from the inlet holes 64a.

The resin frame member 28b has a plurality of outlet grooves 58b at lower positions on both ends of the cathode surface 18a in the width direction and along the width direction of each of the coolant discharge passages 34b.

The resin frame member 28b has a plurality of outlet grooves 62b at lower positions of the cathode surface 18a and adjacent to the upper side of the fuel gas discharge passage 32b. A plurality of outlet holes 64b extend through the resin frame member 28b at the upper ends of the outlet grooves 62b. A plurality of outlet holes 66b extend through the resin frame member 28b above the outlet holes 64b and at positions spaced at predetermined distances from the outlet holes 64b.

Figure 6:
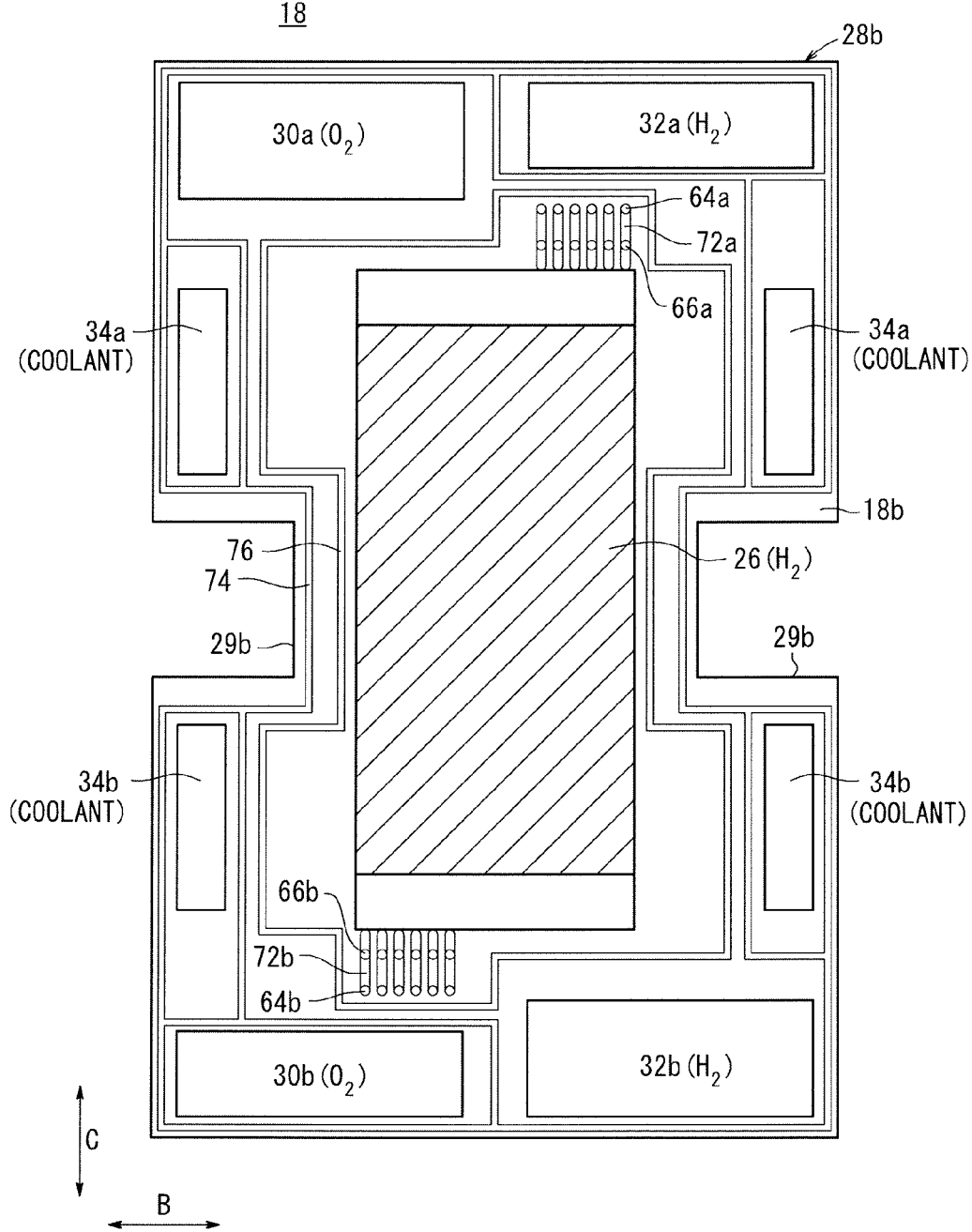
FIG. 6 is a view showing an anode surface of the second membrane electrode assembly.

As shown in FIG. 6, the resin frame member 28b has a plurality of inlet grooves 72a below the fuel gas supply passage 32a. The inlet grooves 72a connect the inlet holes 64a, 66a with each other.

The resin frame member 28b has a plurality of outlet grooves 72b above the fuel gas discharge passage 32b. The outlet grooves 72b connect the outlet holes 64b, 66b with each other.

An outer seal member (outer seal line) 74 and an inner seal member (inner seal line) 76 are provided integrally with the anode surface 18b of the resin frame member 28b. Alternatively, the outer seal member 74 and the inner seal member 76 may be formed separately from the resin frame member 28b, and provided on the anode surface 18b of the resin frame member 28b. The outer seal member 74 is provided along the outer circumferential end of the resin frame member 28b and around all of the fluid passages, i.e., the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b.

The inner seal member 76 is positioned inside the outer seal member 74, and surrounds the anode 26, the inlet holes 64a, 66a, the inlet grooves 72a, the outlet holes 64b, 66b and the outlet grooves 72b together. The inner seal member 76 is provided along a profile line corresponding to the outer shape of the second metal separator 20, and contacts the entire outer circumferential surface of the second metal separator 20. The outer seal member 74 is provided outwardly of the outer circumferential end of the second metal separator 20. All of the fluid passages are hermetically surrounded by the outer seal member 74 and the inner seal member 76.

As shown in FIG. 5, on the cathode surface 18a of the resin frame member 28b, ring-shaped inlet seal members 80a surrounding the inlet holes 66a and ring-shaped outlet seal members 80b surrounding the outlet holes 66b are provided.

The first and second metal separators 16, 20 are dimensioned to have profiles that the first and second metal separators 16, 20 are provided inwardly of the outer circumferential ends of the resin frame members 28a, 28b and inside the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b (all of the fluid passages).

As shown in FIG. 2, the first metal separator 16 is made of a single metal plate. An oxygen-containing gas flow field 84 is formed on a surface 16a of the first metal separator 16 facing the second membrane electrode assembly 18. The oxygen-containing gas flow field 84 faces the cathode 24. A fuel gas flow field 86 is formed on a surface 16b of the first metal separator 16 facing the first membrane electrode assembly 14. The fuel gas flow field 86 faces the anode 26.

Figure 7:
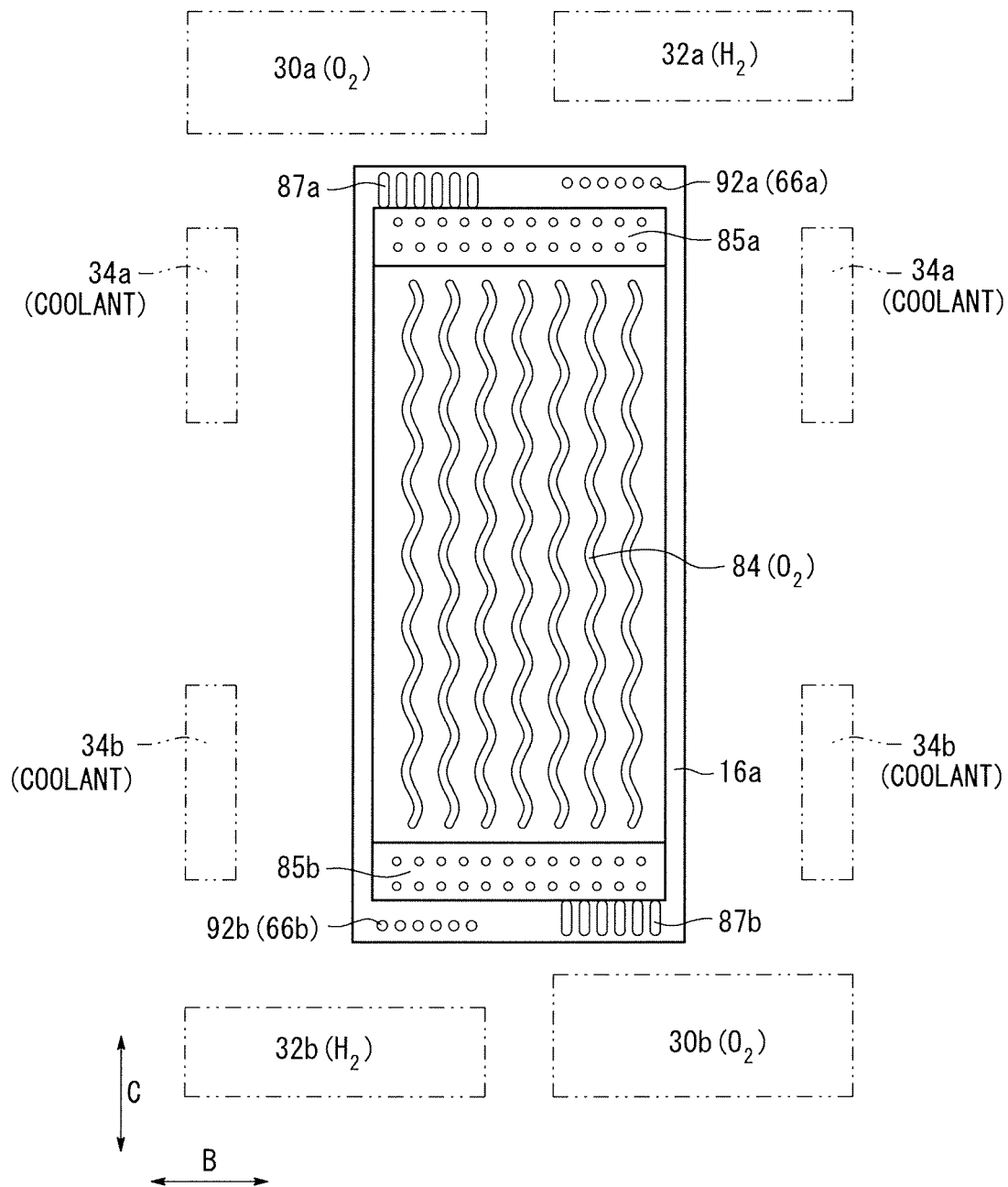
FIG. 7 is a view showing a cathode surface of a first metal separator of the fuel cell.

As shown in FIG. 7, the first metal separator 16 has a rectangular shape elongated in the direction indicated by the arrow C. The oxygen-containing gas flow field 84 formed in the surface 16a of the first metal separator 16 includes a plurality of corrugated flow grooves extending vertically in the direction indicated by the arrow C. An inlet buffer 85a is provided on the upstream side of the oxygen-containing gas flow field 84, and an outlet buffer 85b is provided on the downstream side of the oxygen-containing gas flow field 84.

A plurality of inlet grooves 87a are formed above the inlet buffer 85a and below the oxygen-containing gas supply passage 30a, and a plurality of outlet grooves 87b are formed below the outlet buffer 85b and above the oxygen-containing gas discharge passage 30b.

A plurality of holes 92a are formed at upper positions of the first metal separator 16, and the holes 92a are connected to the inlet holes 66a of the second membrane electrode assembly 18. A plurality of holes 92b are formed at lower positions of the first metal separator 16, and the holes 92b are connected to the outlet holes 66b of the second membrane electrode assembly 18. The holes 92a, 92b extend through the first metal separator 16.

Figure 8:
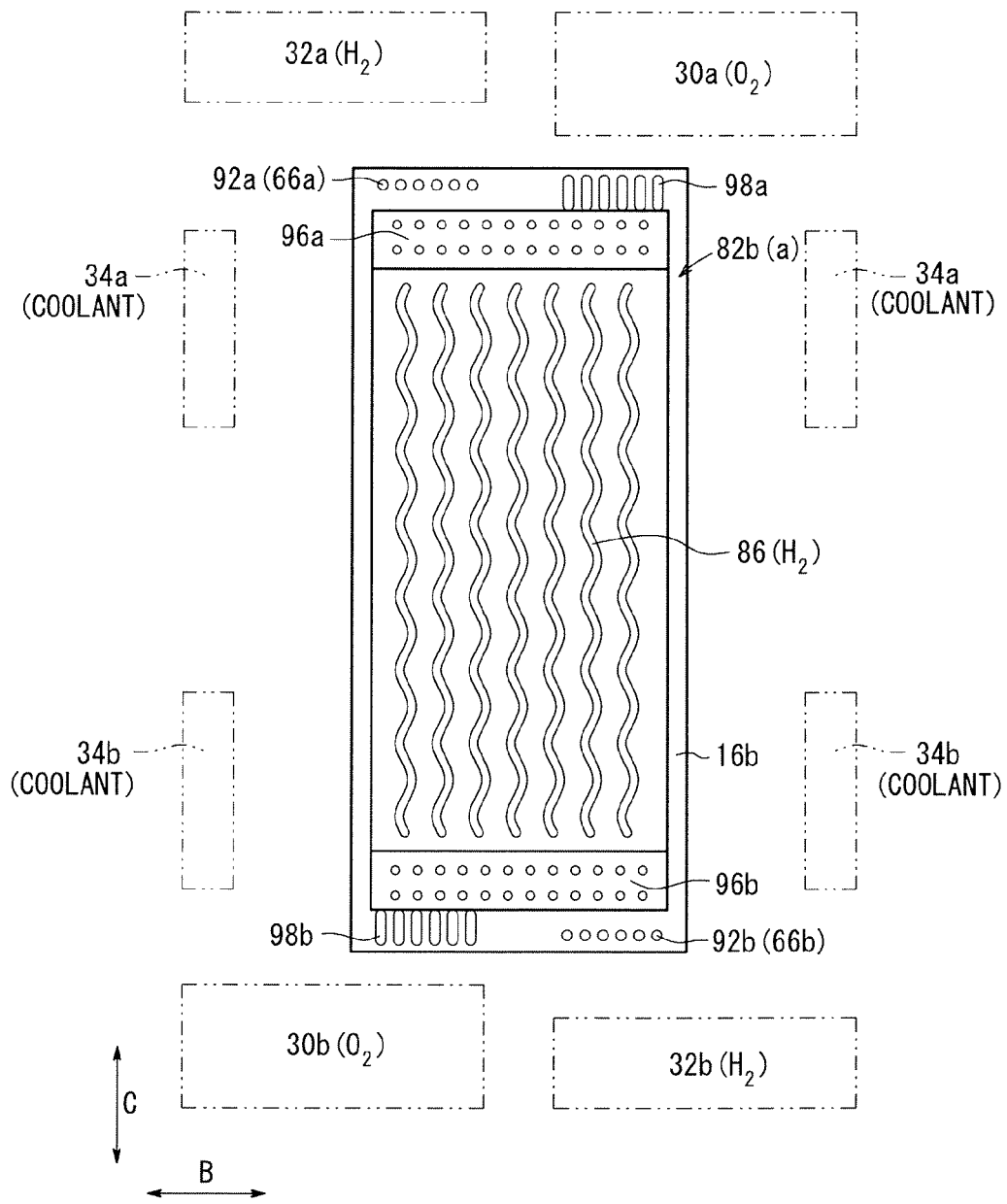
FIG. 8 is a view showing an anode surface of the first metal separator.

As shown in FIG. 8, the first metal separator 16 has the fuel gas flow field 86 in a surface thereof and which includes a plurality of wavy flow grooves extending in a vertical direction indicated by the arrow C. An inlet buffer 96a is provided on the upstream side of the fuel gas flow field 86, and an outlet buffer 96b is provided on the downstream side of the fuel gas flow field 86. A plurality of inlet grooves 98a are formed above the inlet buffer 96a and below the oxygen-containing gas supply passage 30a, and a plurality of outlet grooves 98b are formed below the outlet buffer 96b and above the oxygen-containing gas discharge passage 30b.

As shown in FIG. 2, the second metal separator 20 includes two metal plates (e.g., stainless plates) 102a, 102b having the same outer shape. The metal plates 102a, 102b are stacked together. The outer circumferential edges of the metal plates 102a, 102b are welded or bonded together, and the internal space between the metal plates 102a, 102b is closed hermetically. An oxygen-containing gas flow field 84 facing the cathode 24 is formed on the metal plate 102a, and a fuel gas flow field 86 facing the anode 26 is formed on the metal plate 102b. A coolant flow field 88 is formed between the metal plates 102a, 102b.

Figure 9:
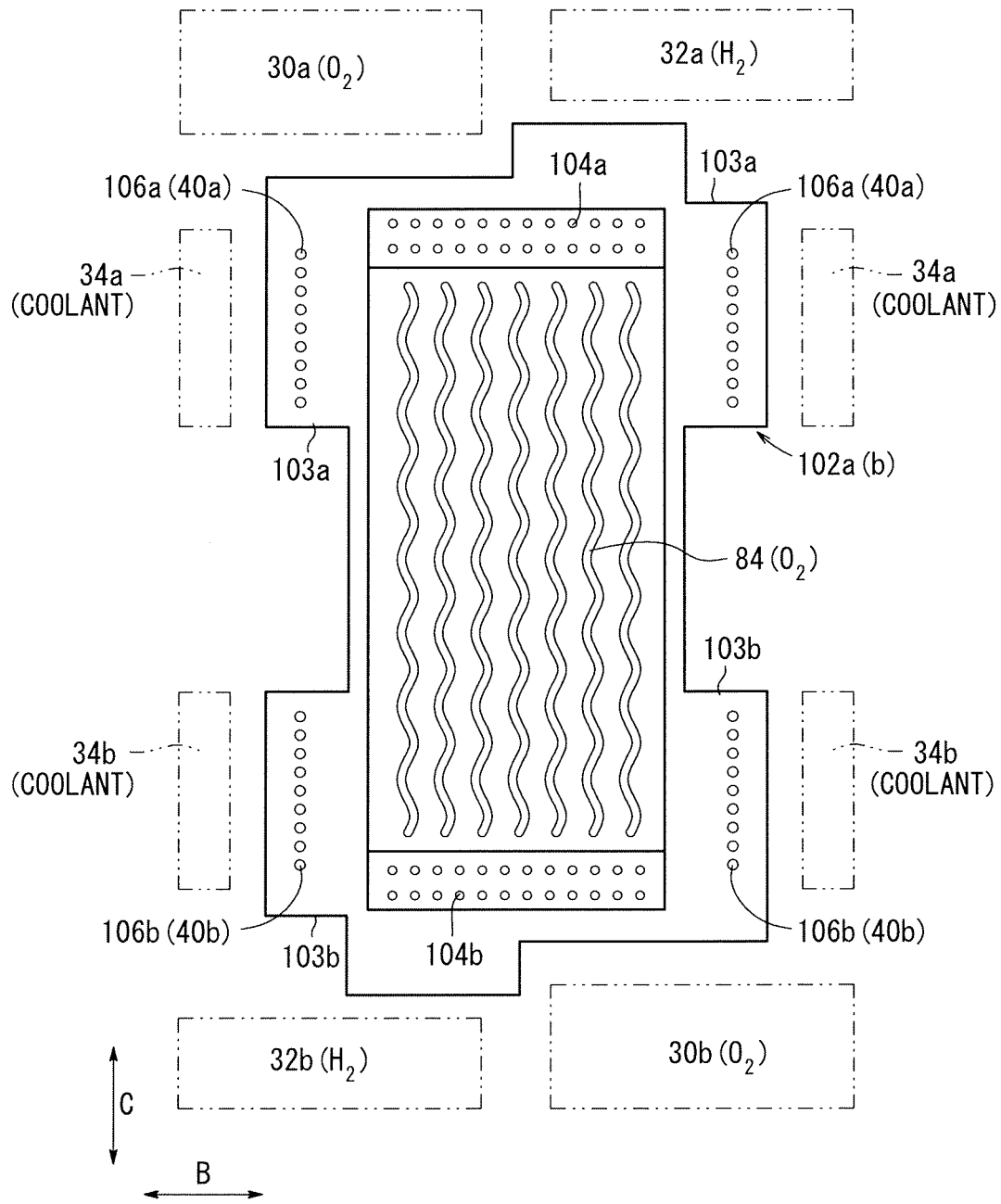
FIG. 9 is a view showing a cathode surface of a second metal separator of the fuel cell.

As shown in FIG. 9, the second metal separator 20 has pairs of projections 103a, 103b at both ends in the direction indicated by the arrow C. The projections 103a, 103b protrude outwardly in the direction indicated by the arrow B. The oxygen-containing gas flow field 84 is provided in the surface of the metal plate 102a. The oxygen-containing gas flow field 84 includes a plurality of flow grooves extending in the vertical direction indicated by the arrow C. An inlet buffer 104a is provided on the upstream side of the oxygen-containing gas flow field 84, and an outlet buffer 104b is provided on the downstream side of the oxygen-containing gas flow field 84.

In the metal plate 102a, a plurality of holes 106a are formed in the projections 103b and along the width direction of the coolant supply passages 34a. The holes 106a are connected to the inlet holes 40a of the first membrane electrode assembly 14. Further, in the metal plate 102a, a plurality of holes 106b are formed in the projections 103b and along the width direction of the coolant discharge passages 34b. The holes 106b are connected to the outlet holes 40b of the first membrane electrode assembly 14.

Figure 10:
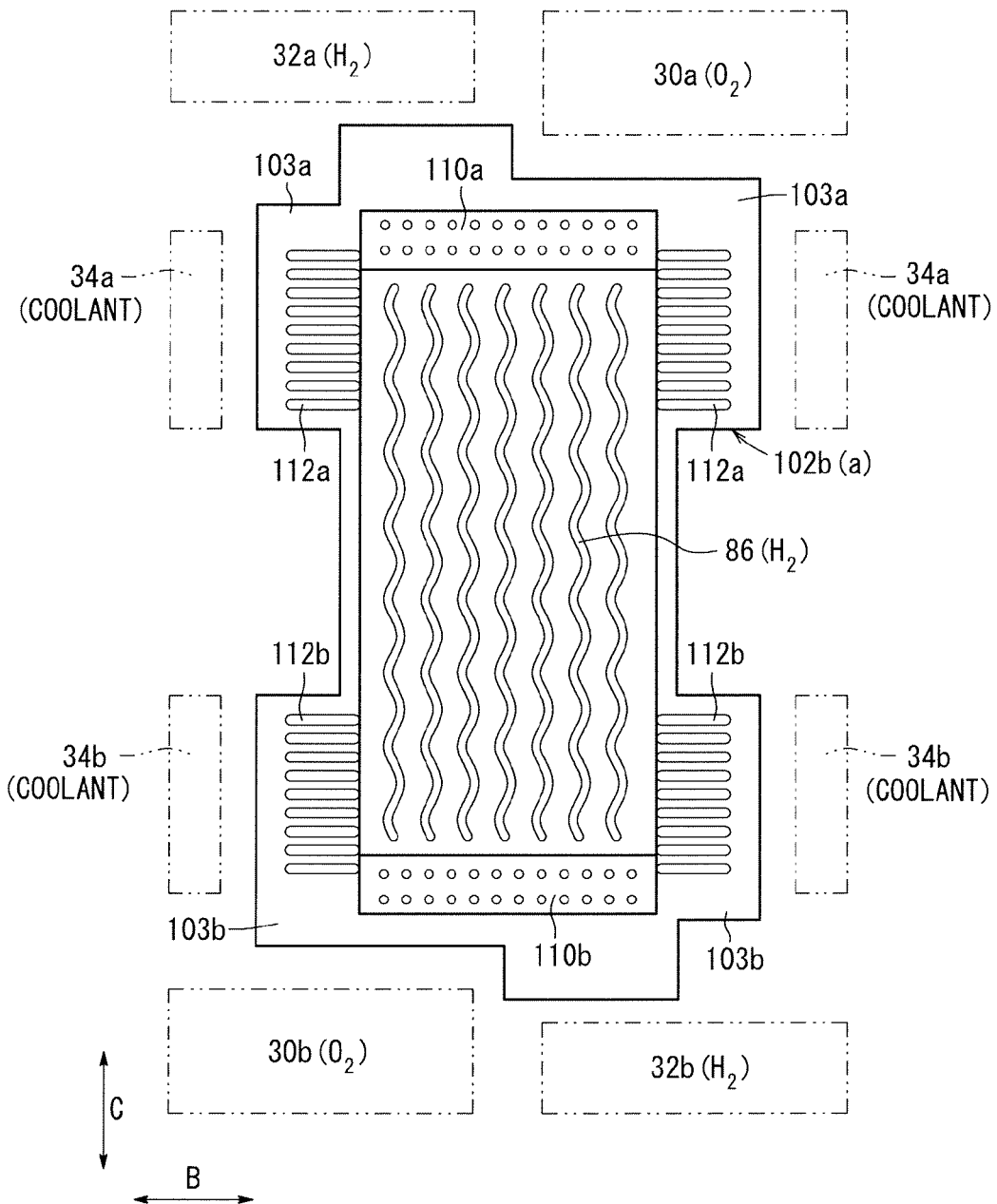
FIG. 10 is a view showing an anode surface of the second metal separator.

As shown in FIG. 10, the second metal separator 20 has the fuel gas flow field 86 in a surface of the metal plate 102b. The fuel gas flow field 86 includes a plurality of flow grooves extending in the vertical direction indicated by the arrow C. An inlet buffer 110a is provided on the upstream side of the fuel gas flow field 86, and an outlet buffer 110b is provided on the downstream side of the fuel gas flow field 86.

A plurality of inlet grooves 112a are formed in the projections 103a of the metal plate 102b and along the width direction of the coolant supply passages 34a, and a plurality of outlet grooves 112b are formed in the projections 103b of the metal plate 102b and along the width direction of the coolant discharge passages 34b. Both of the inlet grooves 112a and the outlet grooves 112b have corrugated structure to form coolant connection channels in the second metal separator 20.

Figure 11:
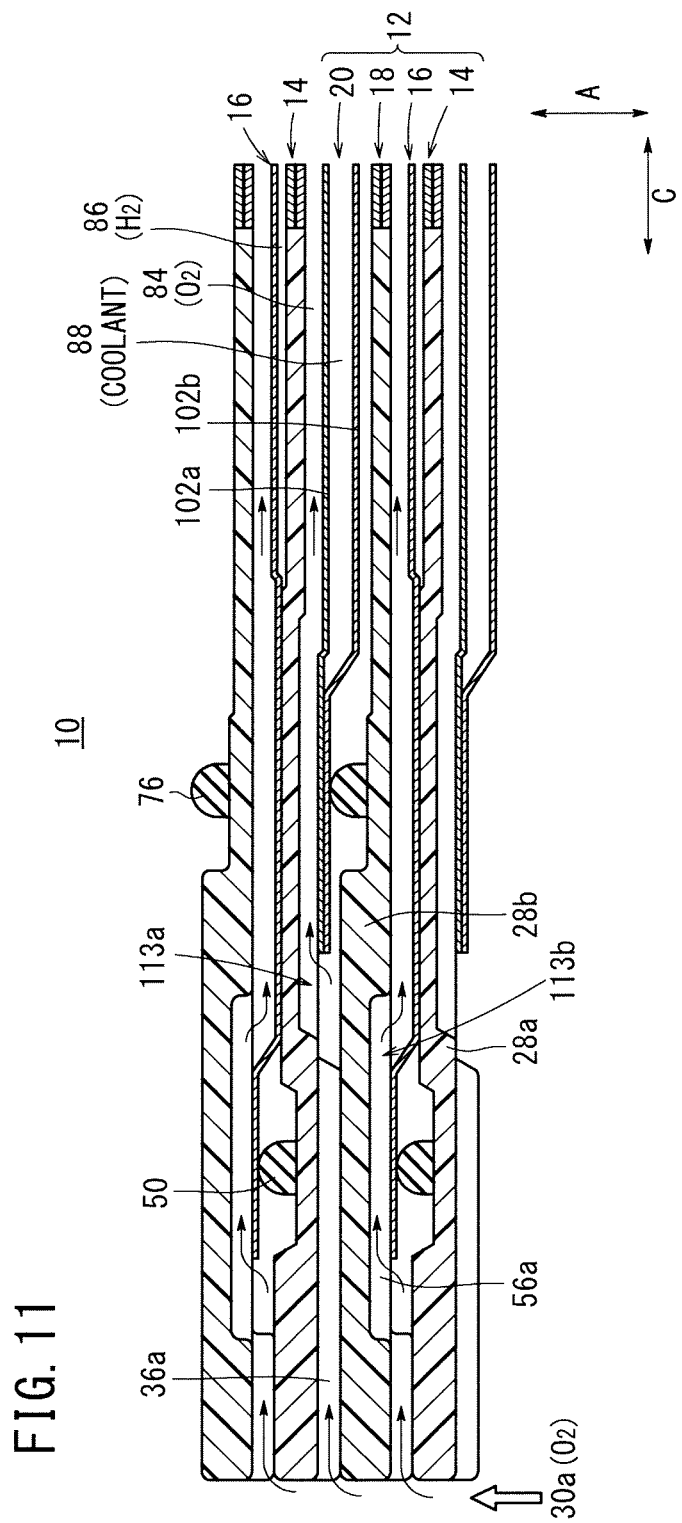
FIG. 11 is a cross sectional view showing the fuel cell, taken along a line XI-XI in FIG. 1.

As shown in FIG. 11, a plurality of oxygen-containing gas connection channels 113a and a plurality of oxygen-containing gas connection channels 113b are formed between the resin frame members 28a, 28b that are adjacent to each other in the stacking direction. The oxygen-containing gas connection channels 113a connects the oxygen-containing gas supply passage 30a with the oxygen-containing gas flow field 84 of the second membrane electrode assembly 18, and the oxygen-containing gas connection channels 113b connects the oxygen-containing gas supply passage 30a with the oxygen-containing gas flow field 84 of the first membrane electrode assembly 14. Though not shown, oxygen-containing gas connection channels connecting the oxygen-containing gas discharge passage 30b with the oxygen-containing gas flow field 84 are formed between the resin frame members 28a, 28b.

Figure 12:
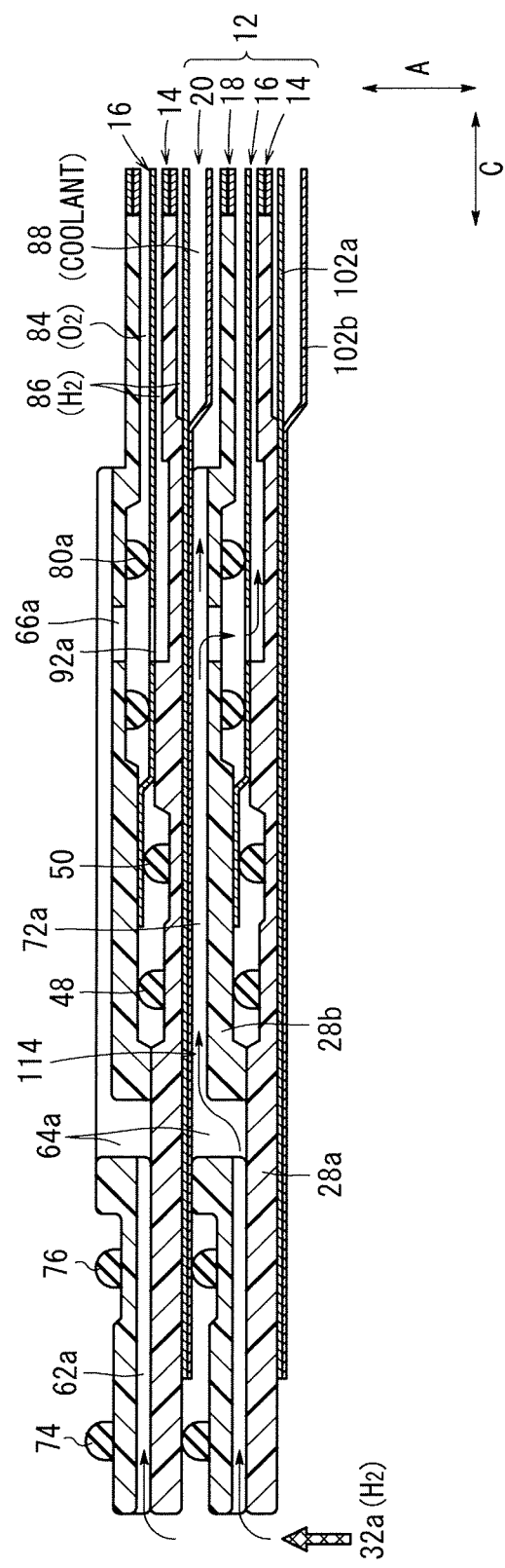
FIG. 12 is a cross sectional view showing the fuel cell, taken along a line XII-XII in FIG. 1.

As shown in FIG. 12, a plurality of fuel gas connection channels 114 are formed between the resin frame members 28a, 28b that are adjacent to each other in the stacking direction. The fuel gas connection channels 114 connect the fuel gas supply passage 32a with the fuel gas flow field 86. Though not shown, fuel gas connection channels connecting the fuel gas discharge passage 32b with the fuel gas flow field 86 are formed between the resin frame members 28a, 28b.

Figure 13:
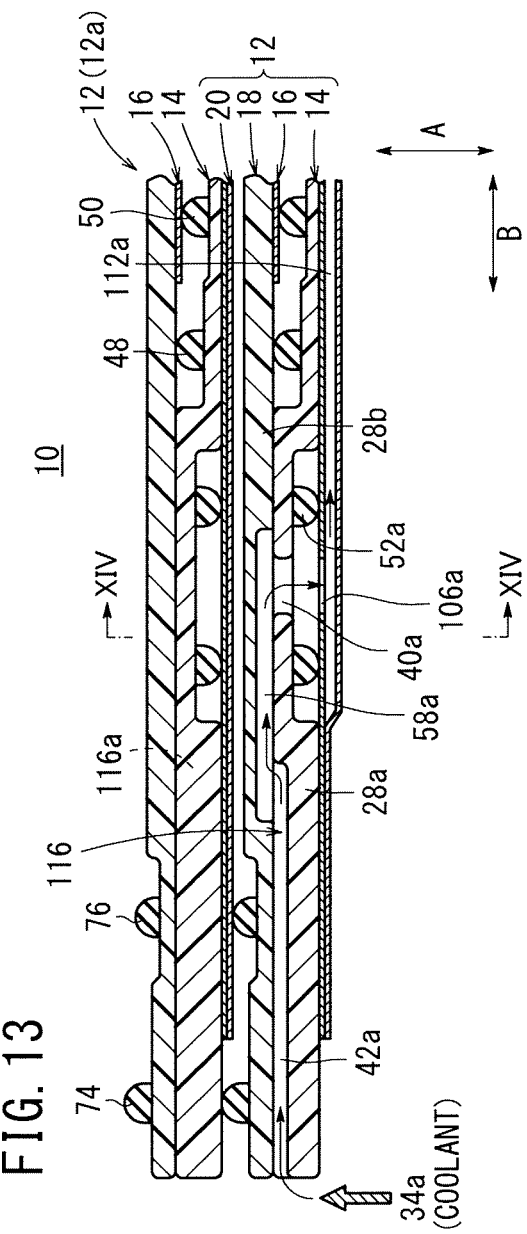
FIG. 13 is a cross sectional view showing the fuel cell, taken along a line XIII-XIII in FIG. 1.

As shown in FIG. 13, a plurality of coolant connection channels 116 are formed between the resin frame members 28a, 28b that are adjacent to each other in the stacking direction. The coolant connection channels 116 connect the coolant supply passage 34a with the coolant flow field 88 of the second metal separator 20. Though not shown, coolant connection channels connecting the coolant discharge passage 34b with the coolant flow field 88 are formed between the resin frame members 28a, 28b.

The coolant connection channels 116 are formed by placing the outer seal member 48 and the inner seal member 50 of the resin frame member 28a, and the outer seal member 74 and the inner seal member 76 of the resin frame member 28b at different positions in the stacking direction.

As shown in FIG. 13, the coolant connection channels 116 include the inlet grooves 42a, 58a provided along the separator surface, the inlet holes (first holes) 40a formed in the resin frame member 28a in the stacking direction, and the holes (second holes) 106a formed in the metal plate 102a of the second metal separator 20 in the stacking direction. Ends of the inlet grooves 42a and ends of the inlet grooves 58a are connected together.

Figure 14:
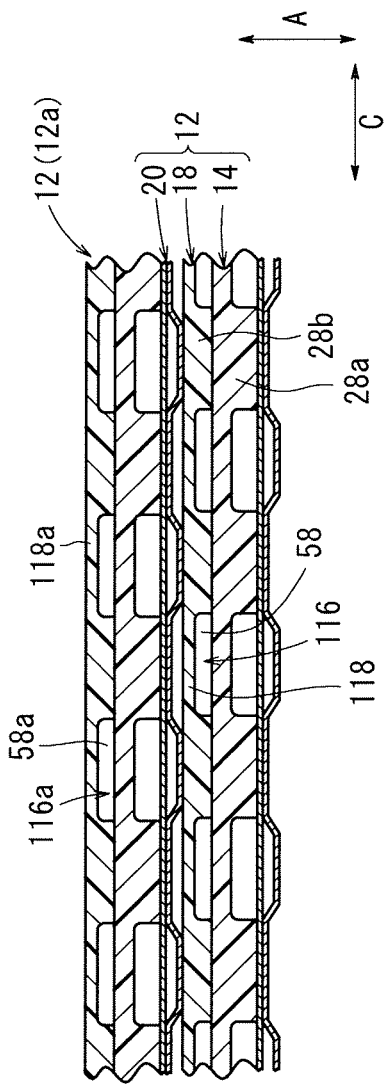
FIG. 14 is a cross sectional view showing the fuel cell, taken along a line XIV-XIV in FIG. 13.

As shown in FIGS. 13 and 14, the fuel cell 10 includes another cell unit 12 (hereinafter simply referred to as the cell unit 12a) adjacent to the cell unit 12. The cell unit 12a is stacked on the cell unit 12. The coolant connection channel 116 (one of connection channels) of the cell unit 12 and the coolant connection channel 116a (the other of connection channels) of the cell unit 12a are offset from each other, and are not overlapped with each other in the stacking direction indicated by the arrow A.

As shown in FIG. 14, the cell unit 12 has a plurality of thin portions 118 to provide grooves of the coolant connection channels 116, and the cell unit 12a has a plurality of thin portions 118a to provide grooves of the coolant connection channels 116a. The thin portions 118 and the thin portions 118a are not overlapped with each other in the stacking direction.

The number of grooves of the coolant connection channels 116 may be the same as the number of grooves of the coolant connection channels 116a. Alternatively, for example, the number of grooves of the coolant connection channels 116 on the lower side in the drawing may be larger than the number of grooves of the coolant connection channels 116a by one.

Operation of this fuel cell 10 will be described below.

As shown in FIG. 1, an oxygen-containing gas is supplied to the oxygen-containing gas supply passage 30a, and a fuel gas such as a hydrogen-containing gas is supplied to the fuel gas supply passage 32a. Further, a coolant such as pure water, ethylene glycol or the like is supplied to the pair of coolant supply passages 34a.

In each of the cell units 12, as shown in FIGS. 1 and 11, the oxygen-containing gas supplied to the oxygen-containing gas supply passage 30a flows into the inlet grooves 36a of the first membrane electrode assembly 14 and into the inlet grooves 56a of the second membrane electrode assembly 18.

The oxygen-containing gas from the inlet grooves 36a is supplied to the oxygen-containing gas flow field 84 of the second metal separator 20. Then, the oxygen-containing gas is supplied from the oxygen-containing gas flow field 84 to the cathode 24 of the first membrane electrode assembly 14. After the oxygen-containing gas is consumed in the power generation reaction, the remaining oxygen-containing gas is discharged through the outlet grooves 36b into the oxygen-containing gas discharge passage 30b.

In the meanwhile, the oxygen-containing gas from the inlet grooves 56a flows through the inlet grooves 87a between the second membrane electrode assembly 18 and the first metal separator 16, and then, the oxygen-containing gas is supplied to the oxygen-containing gas flow field 84 of the first metal separator 16. The oxygen-containing gas from the oxygen-containing gas flow field 84 is supplied to the cathode 24 of the second membrane electrode assembly 18. After the oxy-gen-containing gas is consumed in the power generation reaction, the remaining oxygen-containing gas is discharged through the outlet grooves 87b, 56b into the oxygen-containing gas discharge passage 30b.

Further, as shown in FIGS. 1 and 12, the fuel gas supplied to the fuel gas supply passage 32a flows into the inlet grooves 62a at the cathode 24 of the second membrane electrode assembly 18. The fuel gas from the inlet grooves 62a moves toward the anode 26 through the inlet holes 64a, and then, the fuel gas is partially supplied from the inlet grooves 72a to the fuel gas flow field 86 of the second metal separator 20.

The remaining fuel gas flows through the inlet holes 66a and the holes 92a of the first metal separator 16, and then, flows into between the first metal separator 16 and the first membrane electrode assembly 14. Thereafter, the fuel gas is supplied to the fuel gas flow field 86 of the first metal separator 16.

After the fuel gas is consumed in the power generation reaction in the fuel gas flow field 86 of the second metal separator 20, the fuel gas is discharged into the outlet grooves 72b. Then, the fuel gas is discharged from the outlet holes 64b through the outlet grooves 62b into the fuel gas discharge passage 32b. In the meanwhile, after the fuel gas is consumed in the power generation reaction in the fuel gas flow field 86 of the first metal separator 16, the fuel gas is discharged from the holes 92b through the outlet holes 66b into the outlet grooves 72b. Then, likewise, the fuel gas is discharged into the fuel gas discharge passage 32b.

Thus, in each of the first membrane electrode assembly 14 and the second membrane electrode assembly 18, the oxygen-containing gas supplied to the cathode 24 and the fuel gas supplied to the anode 26 are consumed in electrochemical reactions at catalyst layers of the cathode 24 and the anode 26 for generating electricity.

Further, as shown in FIGS. 1 and 13, the coolant supplied to the pair of the coolant supply passages 34a flows into the inlet grooves 42a of the first membrane electrode assembly 14, and then, the coolant is supplied from the inlet grooves 58a to the inlet holes 40a. The coolant from the inlet holes 40a flows through the holes 106a of the second metal separator 20 into the second metal separator 20.

The coolant flows inside the second metal separator 20 along the inlet grooves 112a from both sides inwardly toward each other in the direction indicated by the arrow B, and the coolant is supplied to the coolant flow field 88. The coolant flowing from both sides toward each other inwardly collides at the center of the coolant flow field 88 in the direction indicated by the arrow B, and moves downwardly, in the direction of gravity indicated by the arrow C. Then, the coolant is distributed toward both sides in the direction indicated by the arrow B at a lower portion of the coolant flow field 88. The coolant flows from the outlet grooves 112b through the holes 106b, and the coolant is discharged from the second metal separator 20. Further, the coolant flows from the outlet holes 40b to the outlet grooves 58b, 42b, and the coolant is discharged into the coolant discharge passages 34b.

Thus, the first membrane electrode assembly 14 and the second membrane electrode assembly 18 are cooled by the coolant flowing through the coolant flow field 88 in the second metal separator 20.

In the first embodiment, as shown in FIGS. 13 and 14, the grooves of the coolant connection channels 116 formed between the resin frame members 28a, 28b of the cell unit 12 and the grooves of the coolant connection channels 116a formed between the resin frame members 28a, 28b of the cell unit 12a are offset from each other, and are not overlapped with each other in the stacking direction indicated by the arrow A.

In the structure, as shown in FIG. 14, the thin portions 118 where the grooves of the coolant connection channels 116 are provided, and the thin portions 118a where the grooves of the coolant connection channels 116a are provided are not overlapped with other in the stacking direction.

Thus, it is possible to reliably suppress stress concentration in the thin portions 118, 118a. Accordingly, the thickness of the resin frame members 28a, 28b can be reduced suitably, it becomes possible to reliably maintain the desired strength, and achieve size reduction in the entire fuel cell 10 easily.

Figure 15:
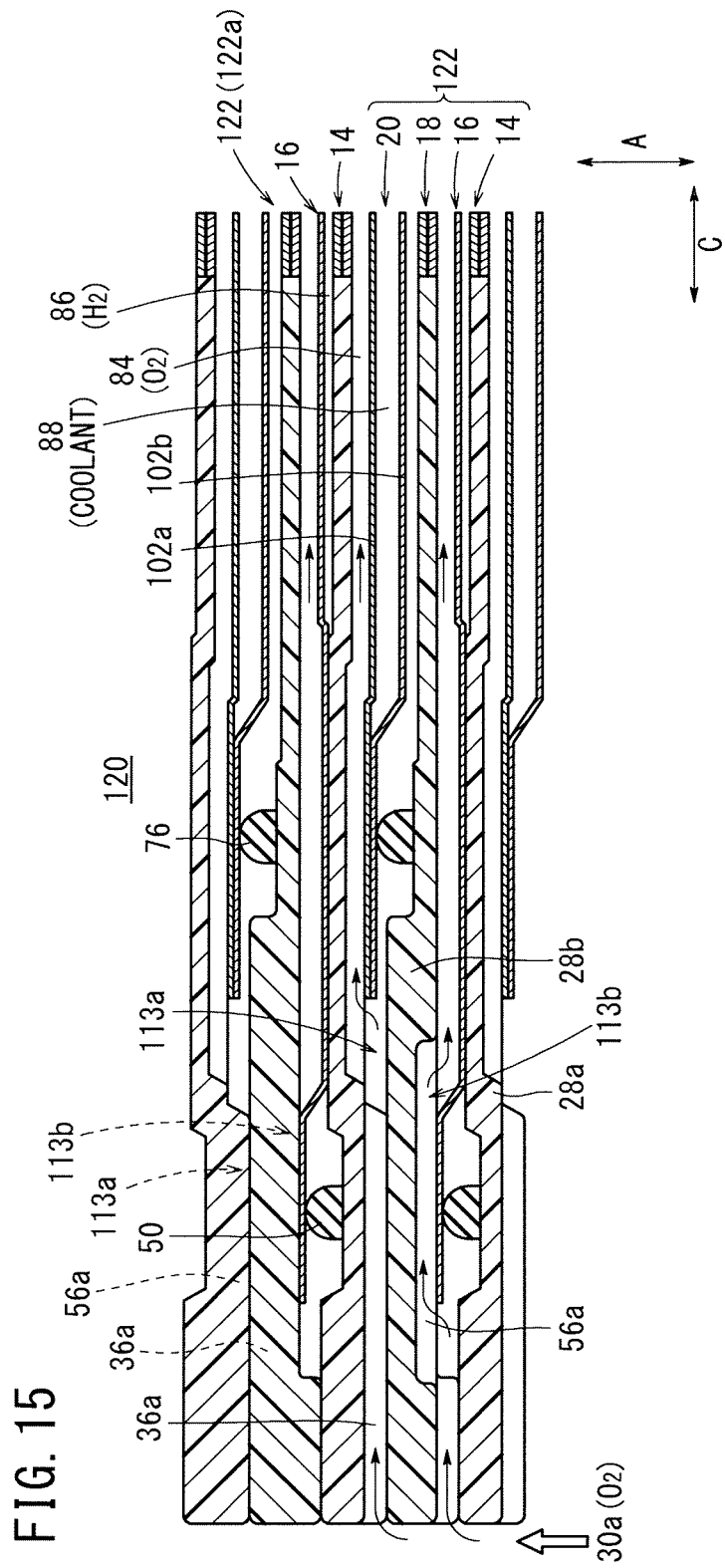
FIG. 15 is a cross sectional view showing a main portion of a fuel cell according to a second embodiment of the present invention.
Figure 16:
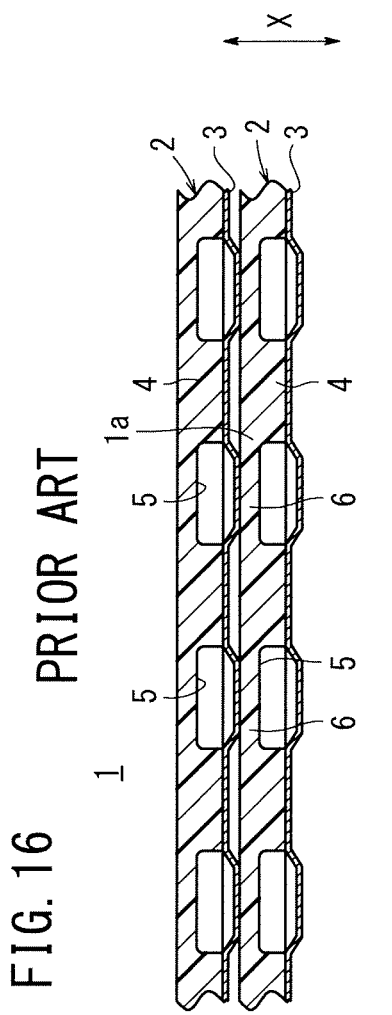
FIG. 16 is a view illustrative of general grooves connecting a coolant flow field and a coolant passage.

FIG. 15 is an exploded perspective view showing a fuel cell 120 according to a second embodiment of the present invention. The constituent elements of the fuel cell 120 that are identical to those of the fuel cell 10 according to the first embodiment are labeled with the same reference numeral, and description thereof will be omitted.

The fuel cell 120 is formed by stacking a plurality of cell units 122. The fuel cell 120 includes another cell unit 122 (hereinafter simply referred to as the cell unit 122a) adjacent to the cell unit 122. The cell unit 122a is stacked on the cell unit 122.

Grooves of oxygen-containing gas connection channels 113a (one of connection channels) of the cell unit 122 and grooves of oxygen-containing gas connection channels 113a (the other of connection channels) of the cell unit 122a are offset from each other, and are not overlapped with each other in the stacking direction indicated by the arrow A. Likewise, grooves of oxygen-containing gas connection channels 113b (one of connection channels) of the cell unit 112 and grooves of oxygen-containing gas connection channels 113b (the other of connection channels) of the cell unit 122a are offset from each other, and are not overlapped with each other in the stacking direction indicated by the arrow A.

In the structure, the oxygen-containing gas connection channels 113a, 113b formed between the resin frame members 28a, 28b of the cell unit 122 and the oxygen-containing gas connection channels 113a, 113b of the cell unit 122a formed between the resin frame member 28a, 28b are offset from each other, and overlapped with each other in the stacking direction indicated by the arrow A.

Thus, the same advantages as in the case of the first embodiment are obtained. For example, the thickness of the resin frame members 28a, 28b can be reduced suitably, it becomes possible to reliably maintain the desired strength, and achieve size reduction in the entire fuel cell 120 easily.

Though not shown, in the same manner, fuel gas connection channels 114 of the cell units that are adjacent to each other in the stacking direction may be offset from each other such that the fuel gas connection channels 114 of the cell units are not overlapped with each other in the stacking direction.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell formed by stacking a plurality of cell units; each of said cell units comprising a first electrolyte electrode assembly, a first metal separator, a second electrolyte electrode assembly and a second metal separator, and formed as a stack; each of the first and second electrolyte electrode assemblies including a pair of electrodes and an electrolyte interposed between the electrodes; a plurality of fluid flow fields being formed in each of the cell units for allowing fluids of a fuel gas and an oxygen-containing gas, respectively, to flow in a direction along electrode surfaces, and a coolant to flow in at least one of the separators, wherein each of a first resin frame member and a second resin frame member is provided integrally with an outer end respectively of the first and second electrolyte electrode assemblies;

a plurality of fluid passages extend through the resin frame members in a stacking direction;

a plurality of connection channels connecting one of the fluid passages and one of the fluid flow fields are formed between the first and second resin frame members for allowing the same fluid to flow through the fluid passages and the fluid flow field; and in the cell units that are adjacent to each other in the stacking direction, one of the connection channels and the other of the connection channels are offset from each other, and are not overlapped with each other in the stacking direction.

2. The fuel cell according to claim 1, wherein the connection channels include a plurality of grooves formed in each of the resin frame members.

3. The fuel cell according to claim 2, wherein the grooves include:

a first groove provided in the first resin frame member; and a second groove provided in the second resin frame member stacked on the first resin frame member; and wherein an end of the first groove and an end of the second groove are connected together.

4. The fuel cell according to claim 1, wherein the outer profile of each of the metal separators is positioned inside the fluid passages, inwardly of the outer end of the frame resin members.

* * * * *